(12) United States Patent
Taira et al.

(10) Patent No.: US 11,579,372 B2
(45) Date of Patent: Feb. 14, 2023

(54) TOOL FOR PLUG, SLIDER, PLUG, AND CABLE WITH PLUG

(71) Applicant: SEIKOH GIKEN CO., LTD., Chiba (JP)

(72) Inventors: Junji Taira, Chiba (JP); Masayuki Jibiki, Chiba (JP); Naotoshi Shiokawa, Chiba (JP)

(73) Assignee: SEIKOH GIKEN CO., LTD., Chiba (JP)

( * ) Notice: Subject to any disclaimer, the term of this patent is extended or adjusted under 35 U.S.C. 154(b) by 337 days.

(21) Appl. No.: 16/806,074

(22) Filed: Mar. 2, 2020

(65) Prior Publication Data

US 2020/0284992 A1 Sep. 10, 2020

(30) Foreign Application Priority Data

Mar. 4, 2019 (JP) .............................. JP2019-038956

(51) Int. Cl.
*G02B 6/24* (2006.01)
*G02B 6/38* (2006.01)

(52) U.S. Cl.
CPC ............. *G02B 6/3821* (2013.01); *G02B 6/24* (2013.01); *G02B 6/389* (2013.01); *G02B 6/3825* (2013.01); *G02B 6/3898* (2013.01)

(58) Field of Classification Search
CPC ......... G02B 6/387; G02B 6/3893; G02B 6/24
USPC ........................................................ 385/53
See application file for complete search history.

(56) References Cited

U.S. PATENT DOCUMENTS

| 10,527,802 | B2 * | 1/2020 | Wong .................... G02B 6/3893 |
| 11,016,250 | B2 * | 5/2021 | Higley .................. G02B 6/3825 |
| 2005/0229394 | A1 * | 10/2005 | Nelson .................... H01R 43/26 29/748 |
| 2009/0226140 | A1 * | 9/2009 | Belenkiy .............. G02B 6/3898 385/134 |
| 2012/0033922 | A1 * | 2/2012 | Nakagawa ........... G02B 6/3879 29/762 |
| 2014/0178007 | A1 * | 6/2014 | Momotsu ............. G02B 6/3849 385/139 |

(Continued)

FOREIGN PATENT DOCUMENTS

| JP | 2002-350677 A | | 12/2002 |
| JP | 2003004975 A | * | 1/2003 |
| JP | 2005-017602 A | | 1/2005 |

*Primary Examiner* — Kaveh C Kianni
(74) *Attorney, Agent, or Firm* — United IP Counselors, LLC

(57) ABSTRACT

A tool for a plug to which a cable having its basal end covered with a boot is attached is disclosed. The plug includes a plug body fitted to an adapter and a slider supported on the plug body. The tool includes an insertion portion that catches the slider, and a boot surrounding part that has a sleeve-like shape and accepts insertion of the cable and the boot, to accommodate the boot while the insertion portion is catching the slider. The boot surrounding part includes a slit extending along an entire length in an axial direction of the boot surrounding part and having a width greater than a diameter of the cable and smaller than a maximum diameter of the boot. While the insertion portion is catching the slider, the boot surrounding part is positioned inner than an outermost shape line of the plug as seen in the axial direction.

13 Claims, 13 Drawing Sheets

(56) References Cited

U.S. PATENT DOCUMENTS

| | | | | |
|---|---|---|---|---|
| 2016/0109661 A1* | 4/2016 | Foung | .................. | G02B 6/3825 |
| | | | | 385/76 |
| 2016/0259135 A1* | 9/2016 | Gniadek | .............. | G02B 6/3895 |
| 2017/0077641 A1* | 3/2017 | Kleeberger | ............ | H01R 24/64 |
| 2018/0217338 A1* | 8/2018 | Takano | ................ | G02B 6/3879 |
| 2018/0217340 A1* | 8/2018 | Wong | .................. | G02B 6/3893 |
| 2018/0292612 A1* | 10/2018 | Chang | .................. | G02B 6/3881 |
| 2019/0018201 A1* | 1/2019 | Takano | ................. | G02B 6/387 |
| 2019/0154924 A1* | 5/2019 | Chang | .................. | G02B 6/3893 |
| 2019/0278028 A1* | 9/2019 | Higley | ................ | G02B 6/3817 |
| 2019/0285806 A1* | 9/2019 | Takano | ................ | G02B 6/3825 |
| 2019/0310432 A1* | 10/2019 | Chang | .................. | G02B 6/3878 |
| 2019/0346633 A1* | 11/2019 | Cloud | .................. | G02B 6/3879 |
| 2020/0284998 A1* | 9/2020 | Higley | ................ | G02B 6/3893 |

\* cited by examiner

TOOL FOR PLUG, SLIDER, PLUG, AND CABLE WITH PLUG

CROSS-REFERENCE TO RELATED APPLICATIONS

This application claims the benefit of priority to Japanese Patent Application No. 2019-038956, filed on Mar. 4, 2019, the entire contents of which are hereby incorporated by reference.

BACKGROUND

1. Technical Field

The present invention relates to a tool for a plug, a slider, a plug, and a cable with plug.

2. Description of the Background

An optical fiber cable and an optical module such as a receiver or a transmitter, or other optical fiber cable, are connected to each other via an adapter (including a so-called receptacle). A plug configured to be fitted to the adapter is provided at a terminal part of the optical fiber cable. In a device such as a communication device on which optical modules are mounted or a plugboard connecting between optical fiber cables, a plurality of adapters may be densely disposed so as to implement a compact device. There is a known tool and a plug with a tool which facilitate fitting and/or removing the plug to/from densely disposed adapters (for example, see Japanese Patent Unexamined Patent Application No. 2002-350677, which is hereinafter referred to as "Patent Literature 1", and Japanese Patent Unexamined Patent Application No. 2005-17602, which is hereinafter referred to as "Patent Literature 2").

The plug disclosed in Patent Literature 1 includes: a plug body configured to be inserted into (fitted to) an adapter, and a knob shiftably supported on the plug body. By the knob being shifted in the removal direction relative to the plug body which is inserted into (fitted to) the adapter, the fitting between the adapter and the plug body is canceled, and the plug body is pulled out from the adapter. The plug insert-remove tool disclosed in Patent Literature 1 includes: a grip part; an insert tool provided at one end in the longitudinal direction of the grip part; and a remove tool provided at the other end.

The insert tool includes: a knob retaining part configured to embracingly retain a knob; and a boot retaining part configured to embracingly retain a boot provided adjacent to the rear edge of the knob. The knob retaining part is provided with a projection part configured to abut on the rear end of the knob. By the grip part being pushed in while the projection part is abutting on the rear end of the knob, the plug body is inserted into the adapter. The remove tool includes: a boot retaining part configured to embracingly retain the boot; and an engaging projection part extending from the boot retaining part and configured to cover the knob. By the grip part being pulled while the engaging projection part is engaging with the knob, the knob is shifted in the removal direction. This cancels the insertion (fitting) between the adapter and the plug body, and the plug body is pulled out from the adapter.

The plug with a remove tool disclosed in Patent Literature 2 includes a plug body configured to be fitted to an adapter, and a knob shiftably supported on the plug body. By the knob being shifted in the removal direction relative to the plug body which is fitted to the adapter, the fitting between the adapter and the plug body is canceled, and the plug body is pulled out from the adapter. The plug with a remove tool disclosed in Patent Literature 2 further includes a pull-tab.

The pull-tab includes: a cover part configured to embracingly retain the knob and the boot on its leading side; and a pull part on its trailing side. The cover part is provided with a catch projection configured to engage with the knob. By the pull part being pulled while the catch projection is engaging with the knob, the knob is shifted in the removal direction. This cancels the fitting between the adapter and the plug body, and the plug body is pulled out from the adapter.

BRIEF SUMMARY

In the plug insert tool disclosed in Patent Literature 1, the knob retaining part configured to embracingly retain the knob is disposed on the outer side of the plug. In the plug extraction tool, the engaging projection part configured to cover the knob is disposed on the outer side of the plug. That is, while a plurality of adapters may be densely disposed, Patent Literature 1 needs space for accommodating the knob retaining parts and the engaging projection parts between the plugs fitted to the adapters. Thus, Patent Literature 1 is not applicable to densely disposed adapters.

In the pull-tab of the plug with a remove tool disclosed in Patent Literature 2 also, the cover part configured to embracingly retain the knob is disposed on the outer side of the plug. Thus, Patent Literature 2 is not applicable to densely disposed adapters.

An object of the present invention is to provide a tool for a plug, a slider, a plug, and a cable with a plug which contribute to implementing a compact device which supports densely disposed adapters.

A first aspect of the present invention is a tool for a plug to which a cable having its basal end covered with a boot is attached. The plug includes a plug body configured to be fitted to an adapter and a slider supported on the plug body. The tool includes: an insertion portion configured to catch the slider; and a boot surrounding part having a sleeve-like shape and configured to accept insertion of the cable and the boot, to accommodate the boot in a state where the insertion portion is catching the slider. The boot surrounding part includes a slit extending along an entire length in an axial direction of the boot surrounding part and having a width greater than a diameter of the cable and smaller than a maximum diameter of the boot. In the state where the insertion portion is catching the slider, the boot surrounding part is positioned inner than an outermost shape line of the plug as seen in the axial direction.

A second aspect of the present invention is a plug including: the tool for a plug; and the slider including a slot configured to accept insertion of the insertion portion.

A third aspect of the present invention is a tool for a plug including a plug body fitted to an adapter and a slider supported on the plug body. The tool includes: an insertion portion configured to catch the slider; a handle extending in a direction opposite to the insertion portion. The handle includes: a first grip part; and a fragile part positioned on the insertion portion side than the first grip part is. A cross-sectional area of the fragile part perpendicular to the direction in which the handle extends is locally small.

A fourth aspect of the present invention is a slider supported on a plug body configured to be fitted to an adapter. The slider includes a handle extending integrally from the slider in a direction opposite to the plug body. The handle includes: a first grip part; and a fragile part positioned on the slider side than the first grip part is. A cross-sectional area of the fragile part perpendicular to the direction in which the handle extends is locally small.

A fifth aspect of the present invention is a cable with a plug, including the cable; and the plug attached to a terminal part of the cable.

The present invention provides a tool for a plug, a slider, a plug, and a cable with a plug which contribute to implementing a compact device which supports densely disposed adapters.

DETAILED DESCRIPTION

First Embodiment

In the following, with reference to the drawings, a description will be given of a first embodiment.

Figure 1:
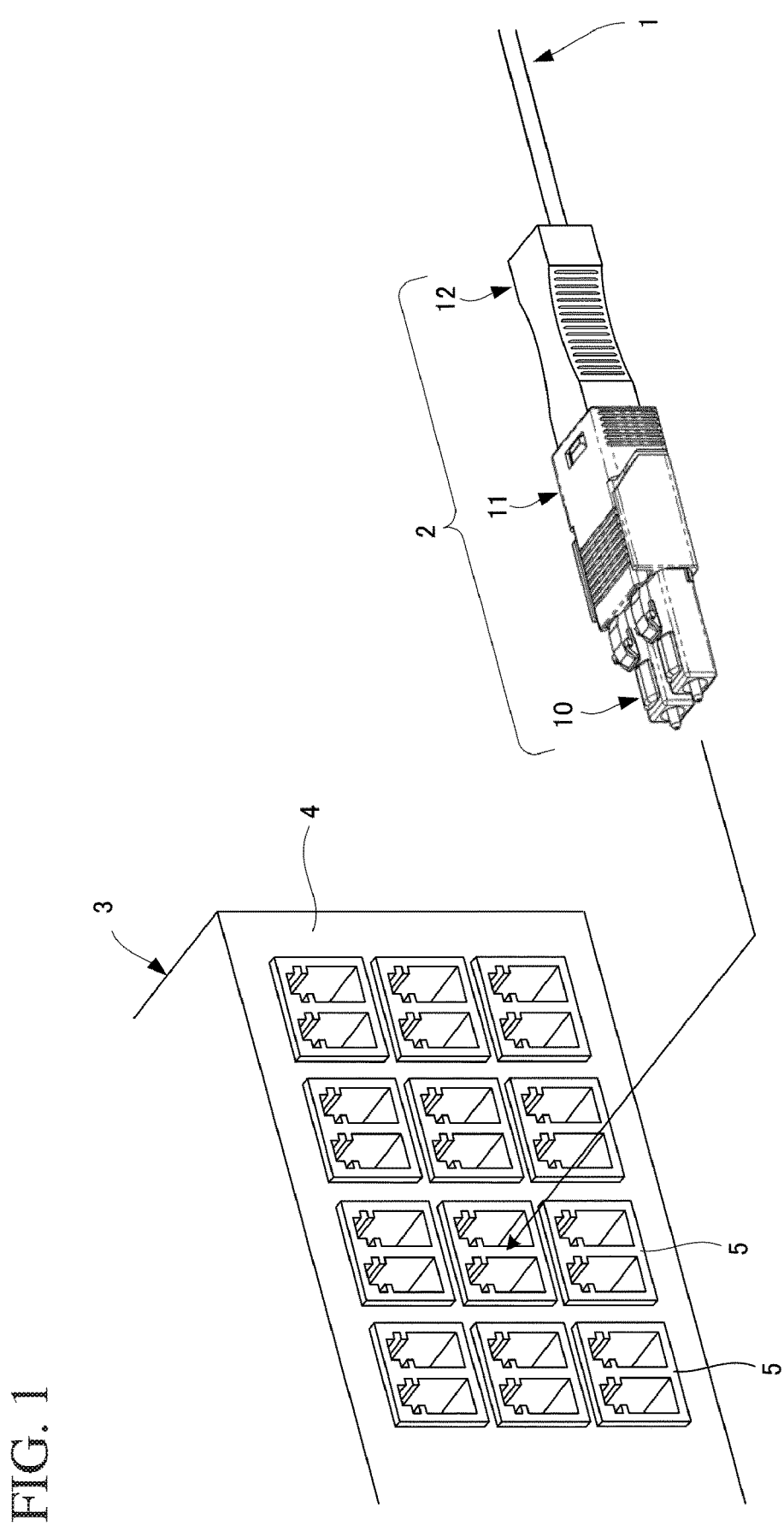
FIG. 1 is a perspective view of a cable with a plug according to a first embodiment.

As shown in FIG. 1, a plug 2 is attached to a terminal part of an optical fiber cable 1. The plug 2 is fitted to an adapter 5 provided at a panel 4 of a device 3. The device 3 is, for example, a communication device or a plugboard. The optical fiber cable 1 is connected to, for example, an optical module installed in the communication device, or other optical fiber cable housed in the plugboard via an adapter 5.

The adapter 5 includes an adapter so-called receptacle of which fitting holes are provided just on the front side of the panel 4, and an adapter of which the fitting holes are provided at a front side and a back side of the panel 4. The adapter 5 of which the fitting holes are provided just on the front side of the panel 4 is representatively used in connecting between the optical fiber cable 1 and an optical module. The adapter 5 having fitting holes provided on both the front side and the back side of the panel 4 is representatively used in connecting between the optical fiber cable 1 and other optical fiber cable.

Figure 2:
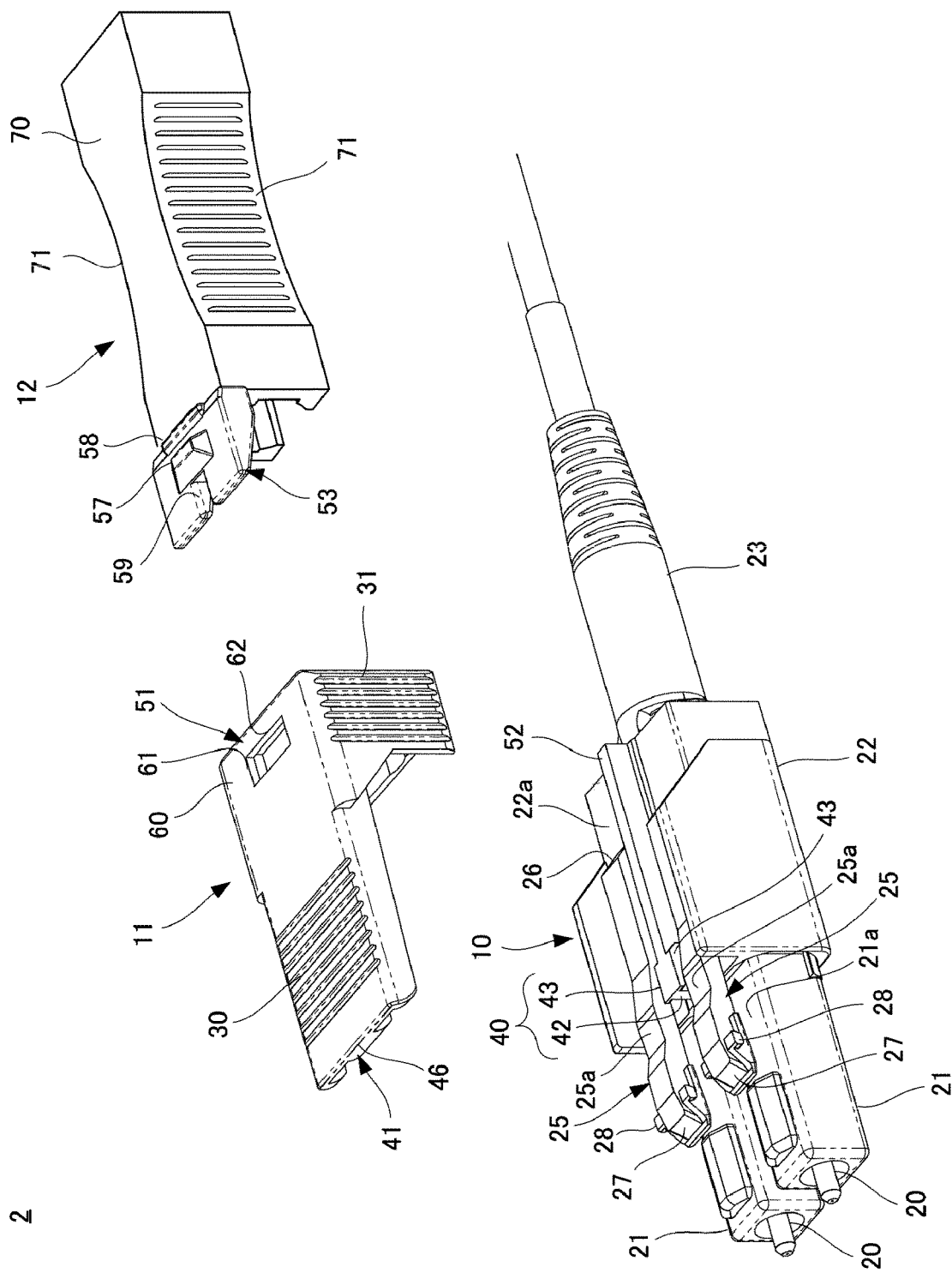
FIG. 2 is an exploded perspective view of the plug.
Figure 3:
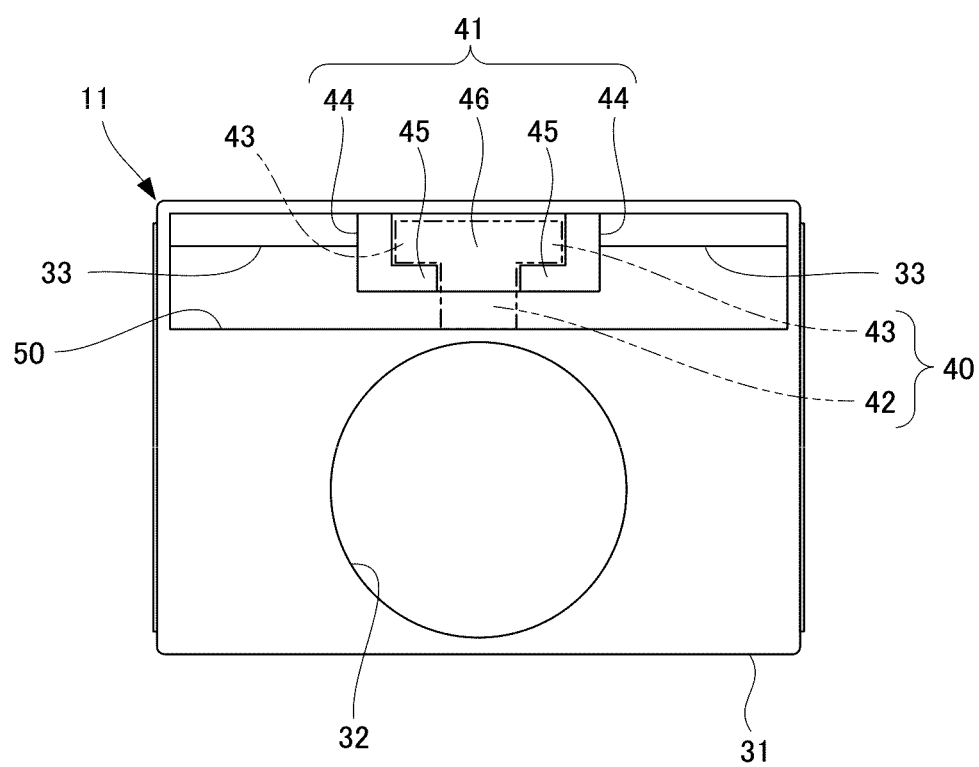
FIG. 3 is a rear view of a slider.

FIGS. 2 and 3 show the structure of the plug 2.

The plug 2 includes a plug body 10, a slider 11, and a tool 12.

The plug body 10 includes ferrules 20, plug frames 21, and a latch frame 22. Each ferrule 20 retains the terminal part of the optical fibers of the optical fiber cable 1. The plug frame 21 supports the ferrule 20. The latch frame 22 supports the plug frame 21.

The optical fiber cable 1 may be a single optical fiber cable, or may be a multi optical fiber cable including two or more optical fibers. The ferrule 20 according to the present embodiment is provided for each optical fiber. The number of the ferrule 20 is changed as appropriate according to the number of optical fibers of the optical fiber cable 1. Note that, each ferrule 20 may be a multi optical fiber ferrule configured to retain a plurality of optical fibers.

The latch frame 22 has a sleeve-like shape. The optical fiber cable 1 is inserted into the latch frame 22, and drawn out from an opening on the one axial end (first end) of the latch frame 22. The basal end of the optical fiber cable 1 drawn out from the latch frame 22 is covered with a boot 23 for preventing the cable from bending. The boot 23 is tapered from the basal end on the latch frame 22 side toward the other end.

The plug frame 21 is inserted into the latch frame 22 from the opening on the other axial end (second end) side of the latch frame 22, and removably caught by the latch frame 22. The tip of the plug frame 21 covering the ferrule 20 is disposed so as to project from the opening on the other axial end (second end) side of the latch frame 22. The tip of the plug frame 21 is fitted to the adapter 5. Hereinafter, the direction in which the plug frame 21 projects from the latch frame 22 is defined as the front side in the plug 2, and the opposite direction is defined as the rear side. By the plug body 10 being pulled rearward, the plug frame 21 is pulled out from the adapter 5.

On one surface (outer surface) 22a of the outer circumference of the latch frame 22, latches 25 configured to be caught by the adapter 5 are provided. Hereinafter, in the plane of the outer surface 22a, the direction perpendicular to the front-rear direction and parallel to the outer surface 22a is defined as the width direction in the plug 2. The direction perpendicular to the outer surface 22a is defined as the top-bottom direction in the plug 2, and the outer surface 22*a* side is defined as the upper side. Note that, while two latches 25 are disposed so as to be spaced apart from each other in the width direction, at least one latch 25 will suffice.

Each latch 25 extends frontward from a support part 26 fixed to the outer surface 22*a* of the latch frame 22. The front end 27 of the latch 25 is disposed above the plug frame 21. The latch 25 and the outer surface 22*a* of the latch frame 22 and the outer surface 21*a* of the plug frame 21 are spaced apart from each other, except for at the support part 26. The elastically bent latch 25 allows the front end 27 to displace from the position above the outer surface 21*a* of the plug frame 21 toward the outer surface 21*a*. The front end 27 is accommodated together with the plug frame 21 in the adapter 5. The front end 27 is provided with a catch projection 28 configured to be caught by the adapter 5.

The slider 11 includes a cover part 30 and a grip part 31. The cover part 30 is disposed above the latch 25. The grip part 31 is disposed behind the latch frame 22. The outer surface 22*a* of the latch frame 22 and the cover part 30 oppose to each other having the latch 25 interposed between them. The outer surface 22*a* of the latch frame 22 is provided with an engaging part 40. The cover part 30 is provided with an engaging part 41 configured to engage with the engaging part 40. The engaging parts 40, 41 support the slider 11 so as to be slidably rearward, in other words, so as to be shiftable in the removal direction in which the plug frame 21 is pulled out from the adapter 5.

The engaging part 40 includes a rib 42 and a pair of wings 43. The rib 42 is fixed to the outer surface 22*a* of the latch frame 22. The wings 43 project on the opposite sides in the width direction from the upper end of the rib 42. The engaging part 40 has a substantially T-shaped cross-sectional shape as a whole, and extends in the front-rear direction.

As shown in FIG. 3, the engaging part 41 of the cover part 30 includes a pair of arms 44, which arms 44 are spaced apart from each other in the width direction. The pair of arms 44 has the rib 42 and the pair of wings 43 interposed in the width direction. By the engagement between the rib 42 and the pair of wings 43 and the pair of arms 44, the cover part 30 is guided in the front-rear direction. Each arm 44 is provided with an engaging tab 45 which is accommodated between the outer surface 22*a* of the latch frame 22 and corresponding wing 43. The engagement between the wings 43 and the engaging tabs 45 restricts loosening of the cover part 30. Thus, the slider 11 is supported so as to be shiftable in the removal direction. Note that, the grip part 31 of the slider 11 disposed behind the latch frame 22 is provided with an insert hole 32 into which the boot 23 is inserted. The engagement between the inner circumference of the insert hole 32 and the boot 23 contributes to the supporting the slider 11.

The engaging part 41 includes a stopper 46 configured to fill up the space between respective front ends of the arms 44. The movable range in the removal direction of the slider 11 is defined by the stopper 46 and the grip part 31. When the slider 11 shifts in the removal direction by a predetermined amount, the stopper 46 abuts on the front edge of the rib 42, to prevent shifting of the slider 11 in the removal direction. When the slider 11 shifts by a predetermined amount in the direction opposite to the removal direction, the grip part 31 abuts on the rear edge of the latch frame 22, to prevent shifting of the slider 11 in the direction opposite to the removal direction.

Note that, the structure of the engaging part 40 and the engaging part 41 is not limited to that described above. For example, the engaging part 41 of the cover part 30 may have the rib 42 and the pair of wings 43, and the engaging part 40 of the latch frame 22 may have the pair of arms 44.

The slider 11 includes push-down parts 33 configured to push down the latches 25 according to shifting in the removal direction. The push-down parts 33 are provided at the cover part 30. Between the outer surface 22*a* of the latch frame 22 and the cover part 30, the latches 25 are interposed. Each latch 25 includes a slide surface 25*a* which is inclined so as to be increasingly spaced apart from the outer surface 22*a* in the removal direction. When the slider 11 shifts in the removal direction, each push-down part 33 slides along the slide surface 25*a* in the removal direction, to push down corresponding latch 25 toward the outer surface 22*a*. The pushed down latch 25 elastically bents, and the front end 27 is displaced toward the outer surface 21*a* of the plug frame 21.

Figure 4A:
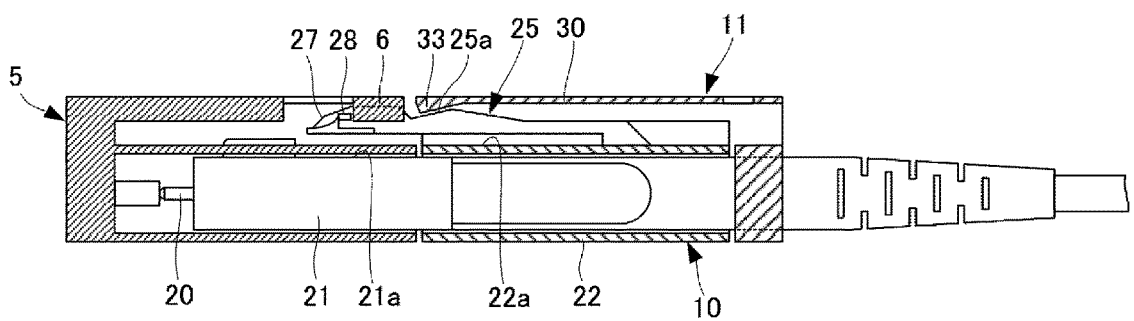
FIG. 4A is a cross-sectional view showing an operation of the parts of the plug in removing the plug from the adapter.
Figure 4B:
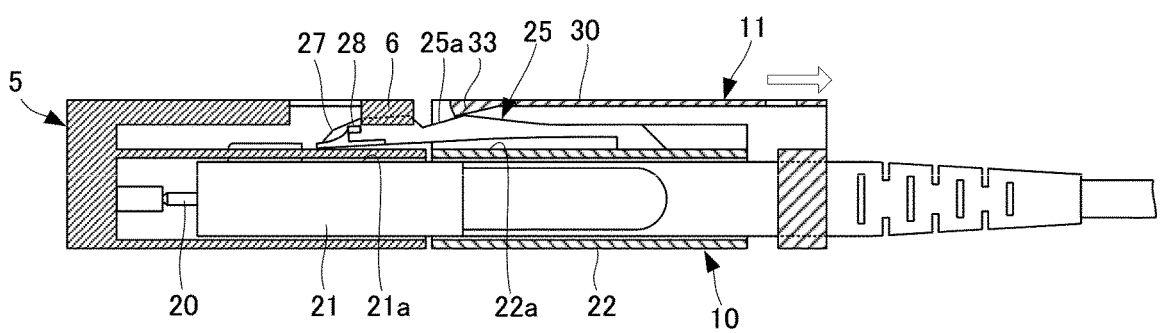
FIG. 4B is a cross-sectional view showing an operation of the parts of the plug in removing the plug from the adapter.
Figure 4C:
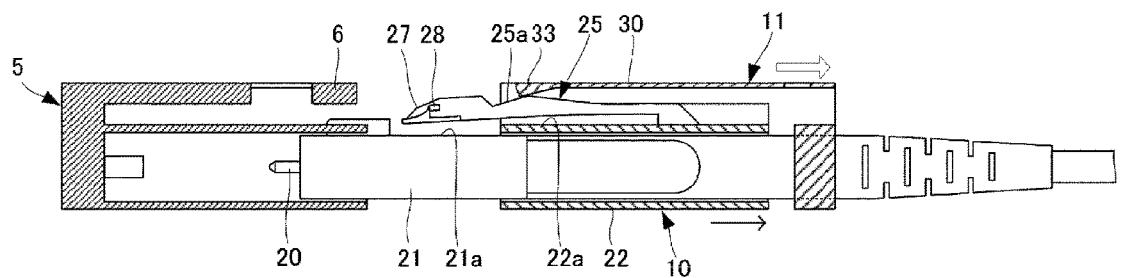
FIG. 4C is a cross-sectional view showing an operation of the parts of the plug in removing the plug from the adapter.

FIGS. 4A to 4C each show an operation of the parts of the plug 2 in canceling fitting between the adapter 5 and the plug body 10.

As shown in FIG. 4A, the plug frame 21 is fitted to the adapter 5. The front end 27 of each latch 25 is also accommodated in the adapter 5. The catch projection 28 provided at the front end 27 is caught by a catch part 6 of the adapter 5.

As shown in FIG. 4B, when the slider 11 is pulled in the removal direction, the slider 11 shifts in the removal direction relative to the plug body 10 fixed to the adapter 5. Then, each push-down part 33 of the slider 11 slides along the slide surface 25*a* of corresponding latch 25, to push down the latch 25. The pushed down latch 25 elastically bents, and the front end 27 is displaced toward the outer surface 21*a* of the plug frame 21. In accordance with the displacement of the front end 27, the engagement between the catch part 6 and the catch projection 28 is canceled, allowing the fitting between the adapter 5 and the plug frame 21 to be canceled.

As shown in FIG. 4C, when the slider 11 is continuously pulled in the removal direction, the slider 11 reaches one end in the removal direction in the movable range. Then, the plug body 10 also is pulled in the removal direction integrally with the slider 11, whereby the engagement between the adapter 5 and the plug frame 21 is canceled. Thus, the plug frame 21 is pulled out from the adapter 5.

In this manner, by the slider 11 shifting in the removal direction, the fitting between the adapter 5 and the plug frame 21 is canceled, and the plug frame 21 is pulled out from the adapter 5.

The tool 12 is used for pulling the slider 11 in the removal direction, thereby removing the plug body 10 from the adapter 5. For example, as shown in FIG. 1, in the case where a plurality of adapters 5 are densely disposed at the panel 4 of the device 3 and a plurality of optical fiber cables 1 connected to the device 3 are also densely disposed and therefore it is difficult for the user to manipulate any slider 11, the tool 12 is attached to the slider 11. The slider 11 is pulled in the removal direction via the tool 12. The tool 12 according to the present embodiment is used also for fitting the adapter 5 to the plug body 10.

As shown in FIGS. 2 and 3, the grip part 31 of the slider 11 includes a slot 50 into which the tool 12 is inserted. The slot 50 opens at the rear surface of the grip part 31. The tool 12 is inserted into the slot 50 in the direction opposite to the removal direction. The slot 50 includes a catch part 51 which is caught by the inserted tool 12.

The slot 50 is continuous to a gap between the latch frame 22 of the plug body 10 and the cover part 30 of the slider 11. At the outer surface 22*a* of the latch frame 22, a pressed part 52 configured to abut on the tool 12 inserted into the slot 50 is provided. While the structure of the pressed part 52 is not particularly specified, the pressed part 52 may be a rib which extends in the front-rear direction.

Figure 5A:
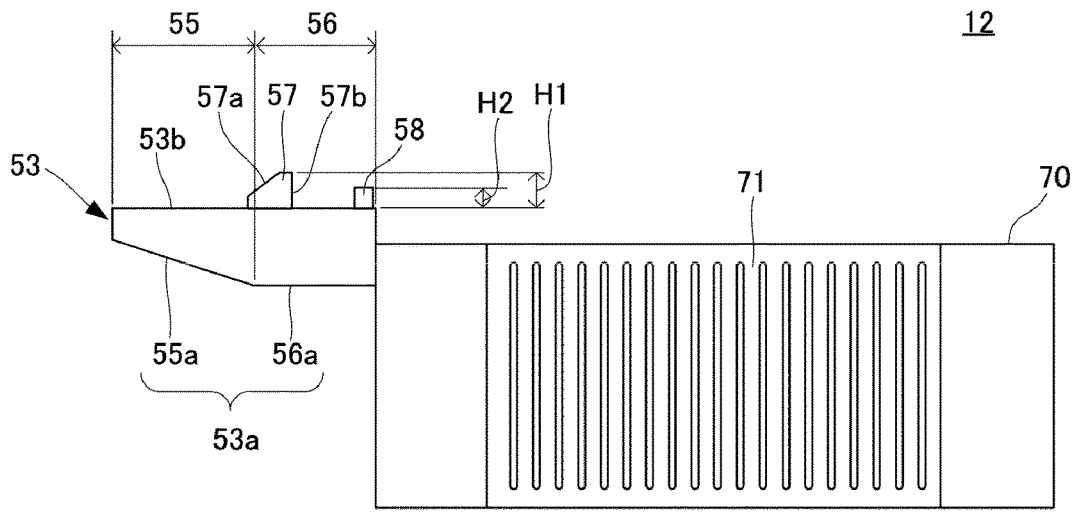
FIG. 5A is a side view of a tool for a plug.
Figure 5B:
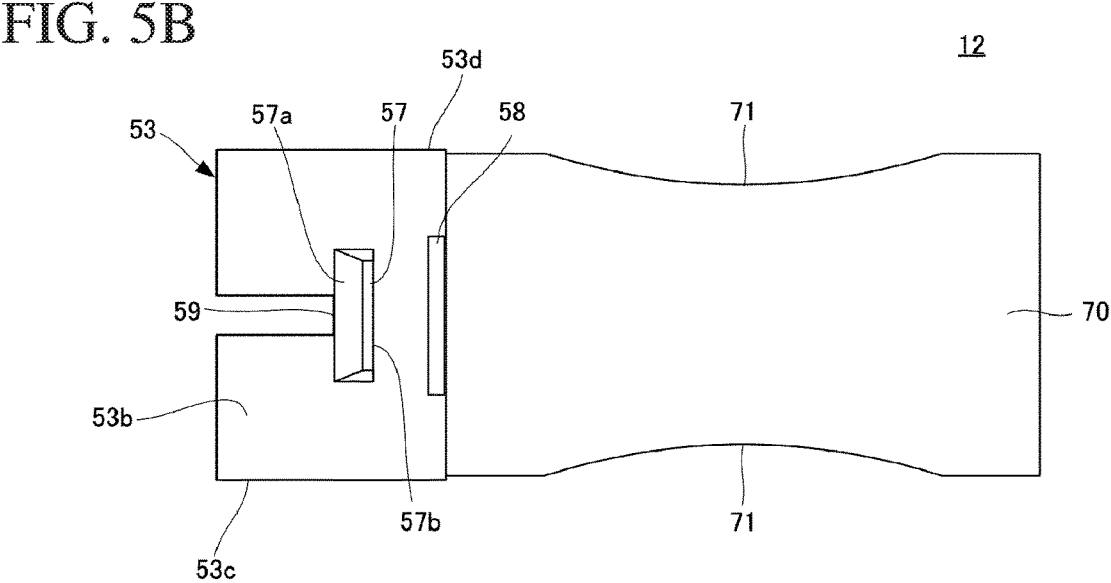
FIG. 5B is a plan view of the tool for a plug.
Figure 5C:
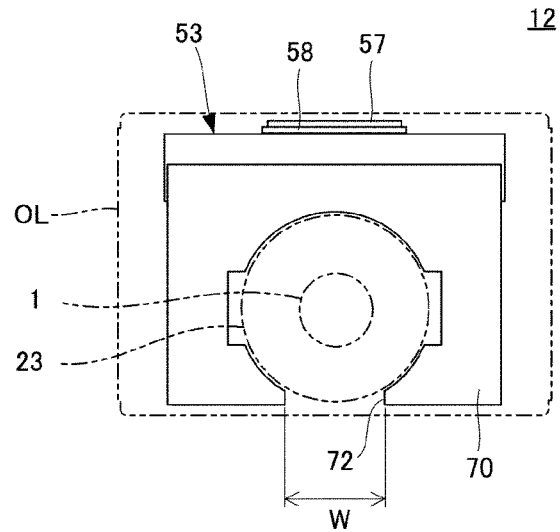
FIG. 5C is a rear view of the tool for a plug.

FIGS. 5A to 5C each show the structure of the tool 12.

The tool 12 includes an insertion portion 53, a boot surrounding part 70, and a handle 71. The insertion portion 53 is inserted into the slot 50 of the slider 11. The boot surrounding part 70 is adjacent to the insertion portion 53. The tool 12 is formed of a resin material. The insertion portion 53, the boot surrounding part 70, and the handle 71 are integrally formed.

The insertion portion 53 includes a taper part 55 and a basal part 56. The taper part 55 has its thickness gradually reduced toward the tip of the insertion portion 53. The basal part 56 is provided adjacent to the taper part 55 on the boot surrounding part 70 side. The taper part 55 includes an inclined surface 55a on a first surface 53a side, which first surface 53a is one of surfaces on the opposite sides of the insertion portion 53 in the thickness direction. The inclined surface 55a is inclined relative to a second surface 53b, which is the other surface. The basal part 56 has a constant thickness. The basal part 56 includes, on the first surface 53a side of the insertion portion 53, a surface 56a which is parallel to the second surface 53b. The insertion portion 53 is inserted into the slot 50 having the second surface 53b oriented upward in the plug 2.

The insertion portion 53 includes a catch projection 57, a pressing projection 58, and a pressing part 59. The catch projection 57 catches the catch part 51 of the slider 11. The pressing projection 58 presses the catch part 51. The pressing part 59 abuts on the pressed part 52 of the plug body 10.

The catch projection 57 is provided in the outer circumferential surface of the insertion portion 53 (the first surface 53a, the second surface 53b, and side surfaces 53c, 53d on the opposite sides in the width direction) excluding the first surface 53a where the inclined surface 55a of the taper part 55 is provided. The catch projection 57 according to the present embodiment is provided at the second surface 53b.

As shown in FIG. 2, the catch part 51 of the slider 11 is provided at, out of four walls surrounding the slot 50, the upper wall 60 which opposes to the second surface 53b of the insertion portion 53 inserted into the slot 50. The catch part 51 according to the present embodiment includes a through hole 61 and an inner wall 62. The through hole 61 is formed at the upper wall 60. The inner wall 62 is formed on the slot opening side of the through hole 61. The catch projection 57 is accommodated in the through hole 61, and caught by the inner wall 62.

A front surface 57a of the catch projection 57 positioned on the tip side of the insertion portion 53 abuts on the catch part 51 when the insertion portion 53 is inserted into the slot 50. The front surface 57a is an inclined surface inclined toward the handle 54 relative to the direction perpendicular to the second surface 53b of the insertion portion 53. When the insertion portion 53 is inserted into the slot 50, the catch part 51 passes over the catch projection 57. By virtue of the front surface 57a being an inclined surface, the catch part 51 smoothly passes over the catch projection 57, and the inserting the insertion portion 53 into the slot 50 is facilitated.

In the state where the insertion portion 53 is inserted into the slot 50, a rear surface 57b on the side opposite to the front surface 57a engages with the inner wall 62 of the catch part 51. The rear surface 57b is substantially perpendicular to the second surface 53b. The rear surface 57b may be disposed on the taper part 55 of the insertion portion 53. The rear surface 57b according to the present embodiment is disposed on the basal part 56.

The pressing projection 58 is provided at the second surface 53b of the insertion portion 53 on the handle 54 side than the catch projection 57 is. A height H2 from the second surface 53b of the pressing projection 58 is smaller than a height H1 of the catch projection 57. In the state where the insertion portion 53 is inserted into the slot 50, the pressing projection 58 is in contact with the catch part 51, or disposed below the catch part 51 having a slight clearance set between the pressing projection 58 and the catch part 51.

The pressing part 59 is provided at the tip of the insertion portion 53. When the insertion portion 53 is inserted into the slot 50, the pressing part 59 abuts on the pressed part 52 of the plug body 10. The pressing part 59 may be the tip surface of the insertion portion 53. The pressing part 59 is formed as a recess capable of accommodating the pressed part 52. Therefore, the pressing part 59 accommodates the pressed part 52 and also functions as a guide for the insertion portion 53 being inserted into the slot 50.

The boot surrounding part 70 has a sleeve-like shape into which the optical fiber cable 1 and the boot 23 can be inserted. The boot surrounding part 70 includes a slit 72 which extends over the entire length in the axial direction. A width W of the slit 72 is greater than the diameter of the optical fiber cable 1, and smaller than the maximum diameter (the outer diameter of the basal end) of the boot 23. An arbitrary portion of the optical fiber cable 1 excluding the basal end covered with the boot 23 is capable of entering the boot surrounding part 70 through the slit 72, and capable of leaving the boot surrounding part 70 through the slit 72. The boot 23 cannot pass through the slit 72. Accordingly, the boot 23 and the boot surrounding part 70 accommodating the boot 23 restrain each other in the diameter direction of the boot 23.

The outer circumference of the boot surrounding part 70 in the cross section perpendicular to the axial direction has a quadrangular shape. A handle 71 is provided at a pair of side surfaces of the boot surrounding part 70. As shown in FIG. 5B, a recessed surface is provided at the axial central part in each side surface of the boot surrounding part 70. The recessed surfaces form the handle 71.

As shown in FIG. 5C, when the tool 12 is seen from the removal direction, the boot surrounding part 70 is positioned inner than an outermost shape line OL of the plug 2. The outermost shape line OL of the plug 2 is, when the plug 2 without the tool 12 is parallel-projected so that the projection line is perpendicular to the projection plane, the contour line of the projection of the plug 2 on the projection plane.

The tool 12 is attached to the plug 2 as follows. Firstly, a portion of the optical fiber cable 1 excluding the basal end covered with the boot 23 is accommodated in the boot surrounding part 70 through the slit 72. Then, the tool 12 accommodating the optical fiber cable 1 in the boot surrounding part 70 is shifted toward the basal end side of the optical fiber cable 1 along the optical fiber cable 1, to accommodate the boot 23 in the boot surrounding part 70. The insertion portion 53 is inserted into the slot 50 of the slider 11, so that the catch projection 57 catches the catch part 51 of the slider 11.

Figure 6A:
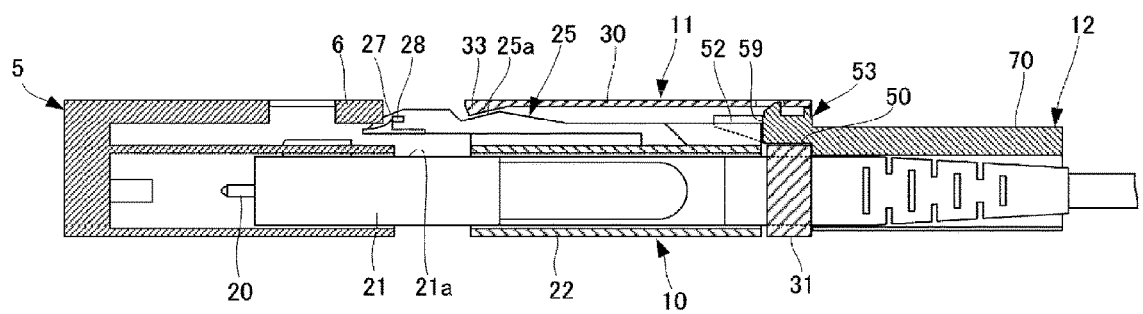
FIG. 6A is a cross-sectional view showing an operation of the parts of the plug in fitting the adapter and the plug to each other using the tool for a plug.
Figure 6B:
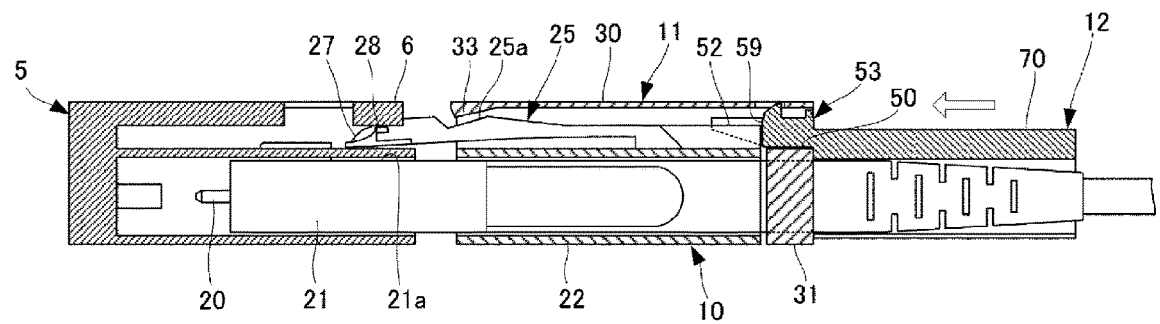
FIG. 6B is a cross-sectional view showing an operation of the parts of the plug in fitting the adapter and the plug to each other using the tool for a plug.
Figure 6C:
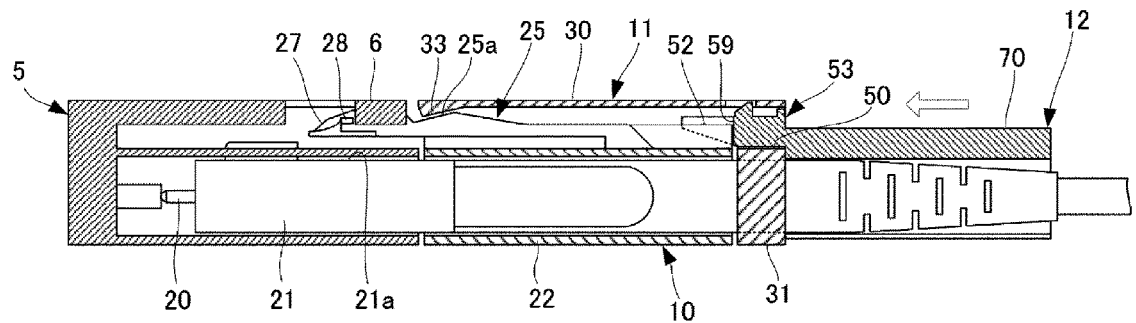
FIG. 6C is a cross-sectional view showing an operation of the parts of the plug in fitting the adapter and the plug to each other using the tool for a plug.

FIGS. 6A to 6C each show an operation of the parts of the plug 2 in fitting the adapter 5 and the plug 2 to each other using the tool 12.

As shown in FIG. 6A, the insertion portion 53 of the tool 12 is inserted into the slot 50 of the slider 11. The pressing part 59 of the insertion portion 53 abuts on the pressed part 52 of the plug body 10.

As shown in FIG. 6B, the handle 71 of the tool 12 is pressed in the fitting direction in which the plug body 10 is fitted to the adapter 5. Then, via the pressing part 59 and the pressed part 52, the plug body 10 also is pressed, to shift the plug body 10 in the fitting direction. In accordance with the shifting of the plug body 10, the plug frame 21 of the plug body 10 and the front end 27 of each latch 25 are inserted into the adapter 5.

As shown in FIG. 6C, until the adapter 5 and the plug frame 21 fit to each other, the plug body 10 shifts in the fitting direction. Then, the catch part 6 of the adapter 5 passes over the catch projection 28 of the latch 25, and the catch projection 28 is caught by the catch part 6.

Note that, the tool 12 may press the slider 11 in place of the plug body 10. For example, by causing the end surface of the boot surrounding part 70 on the slider side to abut on the rear end surface of the slider 11, the slider 11 can be pressed. Note that, preferably, the tool 12 directly presses the plug body 10 fitted to the adapter 5, because the user feels improved manipulating touch with the tool 12 directly pressing the plug body 10, as compared to the tool 12 pressing the slider 11 supported on the plug body 10 shiftably in the removal direction and the fitting direction.

Figure 7A:
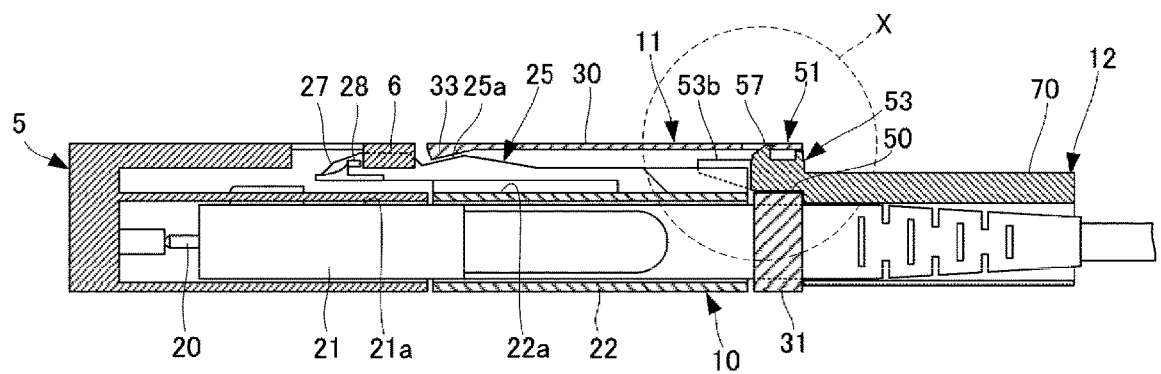
FIG. 7A is a cross-sectional view showing an operation of the parts of the plug in removing the plug from the adapter using the tool for a plug.
Figure 7B:
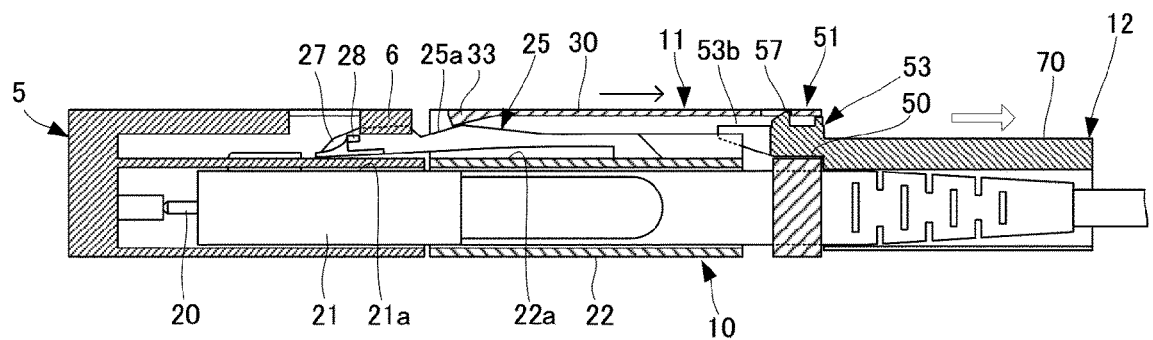
FIG. 7B is a cross-sectional view showing an operation of the parts of the plug in removing the plug from the adapter using the tool for a plug.
Figure 7C:
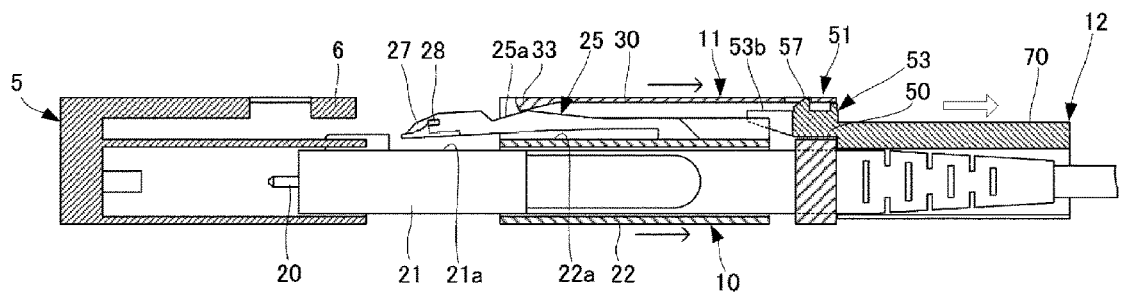
FIG. 7C is a cross-sectional view showing an operation of the parts of the plug in removing the plug from the adapter using the tool for a plug.

FIGS. 7A to 7C each show an operation of the parts of the plug 2 in removing the plug 2 from the adapter 5 using the tool 12.

As shown in FIG. 7A, the plug frame 21 of the plug body 10 is fitted to the adapter 5. The front end 27 of each latch 25 is accommodated in the adapter 5, and the catch projection 28 provided at the front end 27 is caught by the catch part 6 of the adapter 5. The insertion portion 53 of the tool 12 is inserted into the slot 50 of the slider 11. The second surface 53b of the insertion portion 53 is disposed in parallel to the removal direction of the plug body 10. Note that, also in the case where the second surface 53b is slightly inclined (for example, −5° to +5°) relative to the removal direction, it is regarded that the second surface 53b and the removal direction are parallel to each other.

As shown in FIG. 7B, in the state where the second surface 53b of the insertion portion 53 is disposed in parallel to the removal direction of the plug body 10, the handle 71 of the tool 12 is pulled in the removal direction of the plug body 10. Then, the catch projection 57 of the insertion portion 53 catches the catch part 51 of the slider 11, and the slider 11 also is pulled in the removal direction. The slider 11 pulled in the removal direction shifts in the removal direction relative to the plug body 10 fixed to the adapter 5, and each push-down part 33 of the slider 11 pushes down corresponding latch 25. The pushed down front end 27 of the latch 25 is displaced toward the outer surface 21a of the plug frame 21. In accordance with the displacement of the front end 27, the engagement between the catch part 6 of the adapter 5 and the catch projection 28 provided at the front end 27 is canceled, allowing the fitting between the adapter 5 and the plug frame 21 to be canceled.

As shown in FIG. 7C, as the tool 12 is continuously pulled in the removal direction, the slider 11 reaches one end in the removal direction in the movable range. Subsequently, integrally with the slider 11, the plug body 10 also is pulled in the removal direction. Thus, the fitting between the adapter 5 and the plug frame 21 is canceled, and the plug frame 21 is pulled out from the adapter 5.

Figure 8:
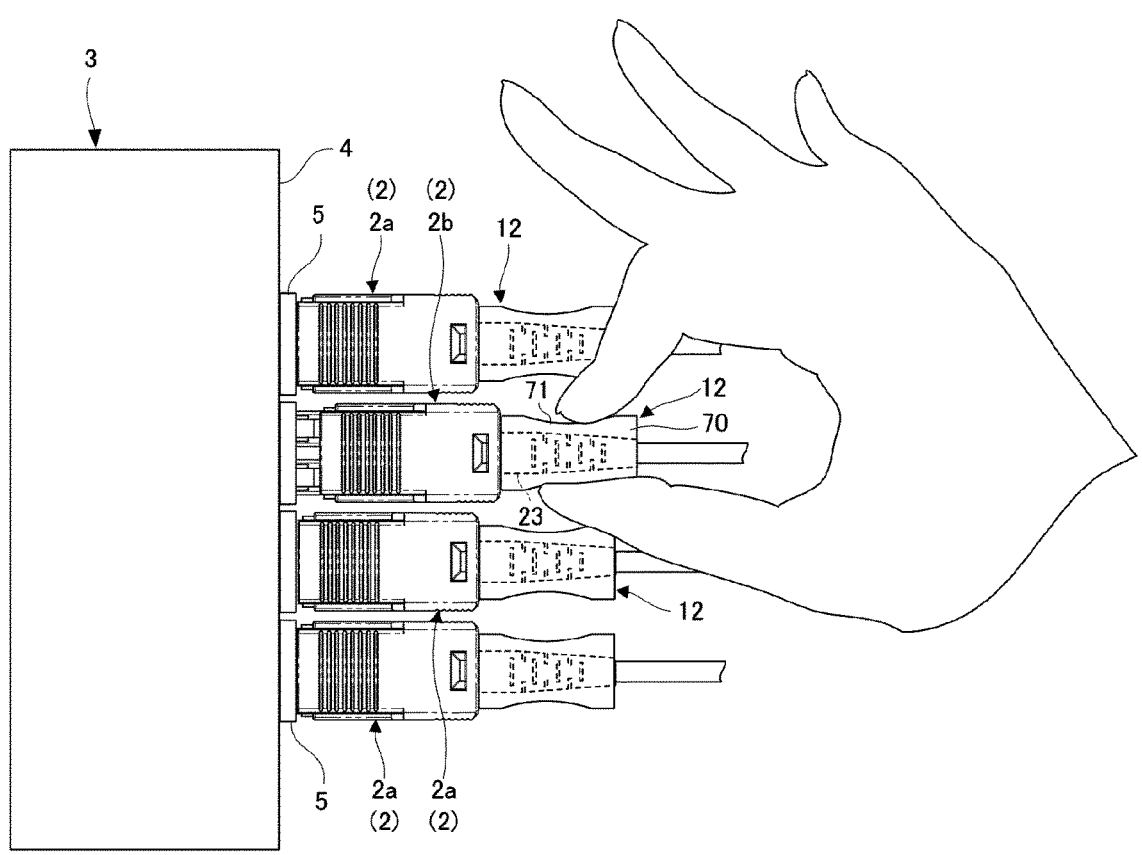
FIG. 8 is a schematic illustration for describing the operation of the tool for a plug shown in FIGS. 5A to 5C.

FIG. 8 schematically shows the operation of the tool 12.

In the example shown in FIG. 8, to part of a plurality of adapters 5 provided at the panel 4 of the device 3, the plugs 2 are already fitted. The adapters 5 are densely disposed, and there exists just a slight clearance between adjacent two pieces of plugs 2 fitted to the adapters 5. In this state, a plug 2 is fitted to a free adapter 5. Hereinafter, the plugs 2 already fitted to the adapter 5 are referred to as the plugs 2a and the plug 2 to be fitted to the free adapter 5 is referred to as the plug 2b, to be distinguished from each other.

To the plug 2b, the tool 12 is attached. The boot surrounding part 70 of the tool 12 accommodates the boot 23, and restrains the boot 23 in the diameter direction. The insertion portion 53 of the tool 12 is inserted into the slot 50 of the slider 11, to catch the slider 11. Thus, the plug 2b is retained on the tool 12 without coming off frontward. This improves workability in fitting the plug 2b to the adapter 5.

As shown in FIG. 5C, the boot surrounding part 70 of the tool 12 is positioned inner than the outermost shape line OL of the plug 2. Accordingly, the clearance between the tool 12 attached to the plug 2b and the tools 12 attached to the plugs 2a around the plug 2b is wider than the clearance between the plug 2b and the surrounding plugs 2a. This allows the user to surely grip the handle 71 of the tool 12 attached to the plug 2b and facilitates the user's manipulating the tool 12. In particular, in the present embodiment, since the handle 71 is formed in a recessed manner at the side surfaces of the boot surrounding part 70, the clearance around the handle 71 is increasingly widened.

The boot 23 and the boot surrounding part 70 accommodating the boot 23 restrain each other in the diameter direction of the boot 23. This minimizes any tilting of the tool 12 relative to the plug 2b. Thus, the force applied to the tool 12 is fully used in fitting the plug 2b and the adapter 5 to each other. This also minimizes the risk of breakage of the insertion portion 53 and the slot 50 that may otherwise be done by excessively tilted tool 12.

While the foregoing is the operation of the tool 12 is the operation in fitting the plug 2b and the adapter 5 to each other, this similarly applies to the operation in removing the plug 2b from the adapter 5. That is, the user is allowed to surely grip the handle 71 of the tool 12 attached to the plug 2b, to manipulate the tool 12 and easily pull out the plug 2b from the adapter 5. The force applied to the tool 12 is fully used in pulling out the plug 2b. This also minimizes the risk of breakage of the insertion portion 53 and the slot 50 that may otherwise be done by excessively tilted tool 12.

The length of the boot surrounding part 70 may be set as appropriate in view of workability. The length of the boot surrounding part 70 may be greater than, shorter than, or equal to the length of the boot 23.

Figure 9A:
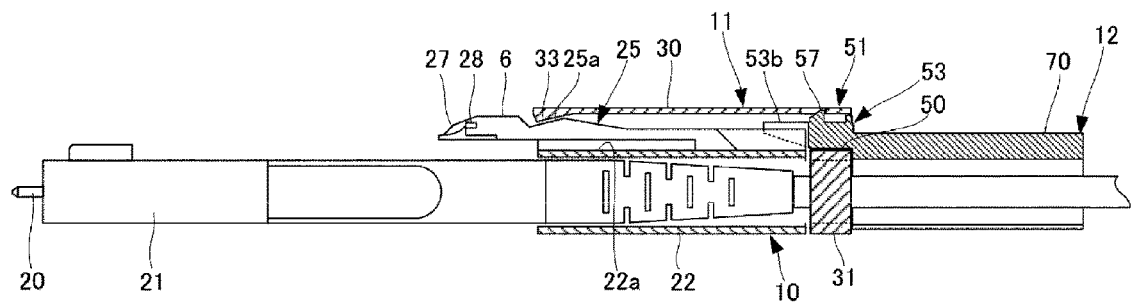
FIG. 9A is a cross-sectional view showing an operation of the parts of the plug in removing the tool for a plug.
Figure 9B:
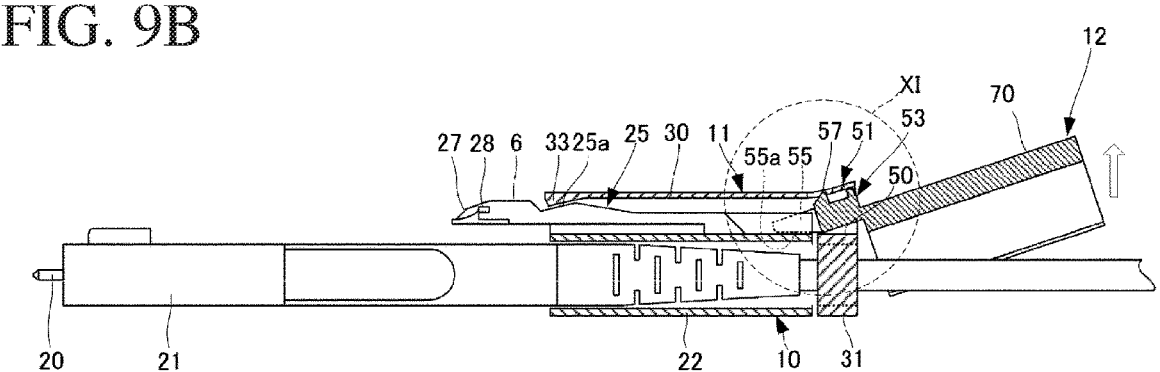
FIG. 9B is a cross-sectional view showing an operation of the parts of the plug in removing the tool for a plug.
Figure 9C:
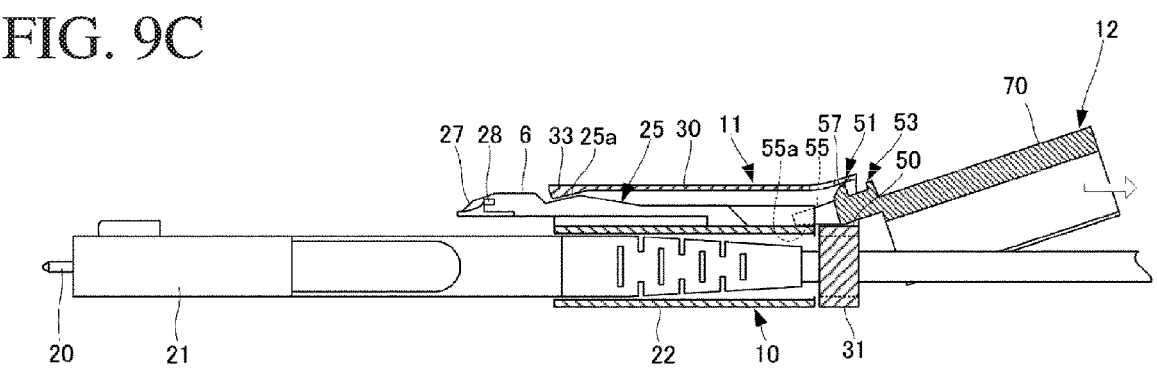
FIG. 9C is a cross-sectional view showing an operation of the parts of the plug in removing the tool for a plug.

The tool 12 attached to the plug 2 is pulled out from the plug 2 in the state where the plug 2 is pulled out from the adapter 5. FIGS. 9A to 9C each show an operation of the parts of the plug 2 in removing the tool 12.

As shown in FIG. 9A, the insertion portion 53 of the tool 12 is inserted into the slot 50 of the slider 11. In removing the tool 12 from the plug 2, firstly, the plug frame 21 of the plug body 10 is pulled out frontward from the latch frame 22. In accordance with the plug frame 21 being pulled out, the optical fiber cable 1 and the boot 23 are pulled into the latch frame 22, and the boot surrounding part 70 of the tool 12 accommodates a portion of the optical fiber cable 1 except for the basal end covered with the boot 23. The width W of the slit 72 of the boot surrounding part 70 (see FIG. 5C) is greater than the outer diameter of the optical fiber cable 1, and the portion of the optical fiber cable 1 accommodated in the boot surrounding part 70 is capable of leaving the boot surrounding part 70 through the slit 72. Accordingly, the restrain of the boot surrounding part 70 is canceled, and the tool 12 is allowed to be inclined relative to the plug 2.

As shown in FIG. 9B, the boot surrounding part 70 of the tool 12 (the handle 71) is shifted, and the tool 12 is inclined relative to the plug 2. Thus, the inclined surface 55a of the taper part 55 is disposed in parallel to the front-rear direction (the fitting or removal direction) of the plug 2. Note that, in the case where the inclined surface 55a is slightly inclined (for example, −5° to +5°) relative to the front-rear direction also, it is regarded that the inclined surface 55a and the front-rear direction are parallel to each other.

As shown in FIG. 9C, in the state where the inclined surface 55a of the taper part 55 is disposed in parallel to the front-rear direction of the plug 2, the tool 12 is pulled rearward from the plug 2. Thus, the catch projection 57 of the insertion portion 53 cancels the catching between the slider 11 and the catch part 51, whereby the insertion portion 53 is pulled out from the slot 50 of the slider 11. Through the foregoing operations, the tool 12 is pulled out from the plug 2.

Figure 10:
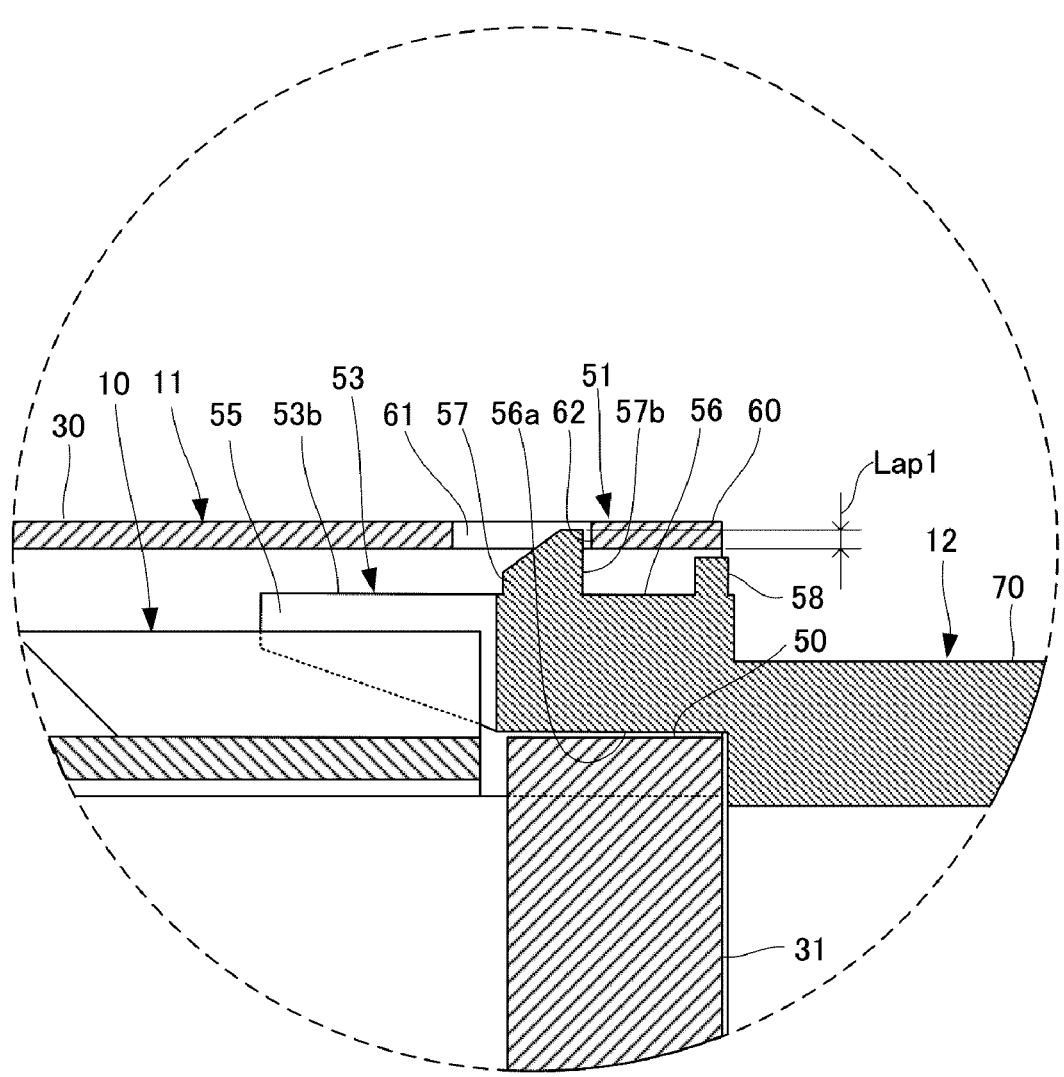
FIG. 10 is an enlarged view of a portion encircled by broken-line circle X in FIG. 7A.
Figure 11:
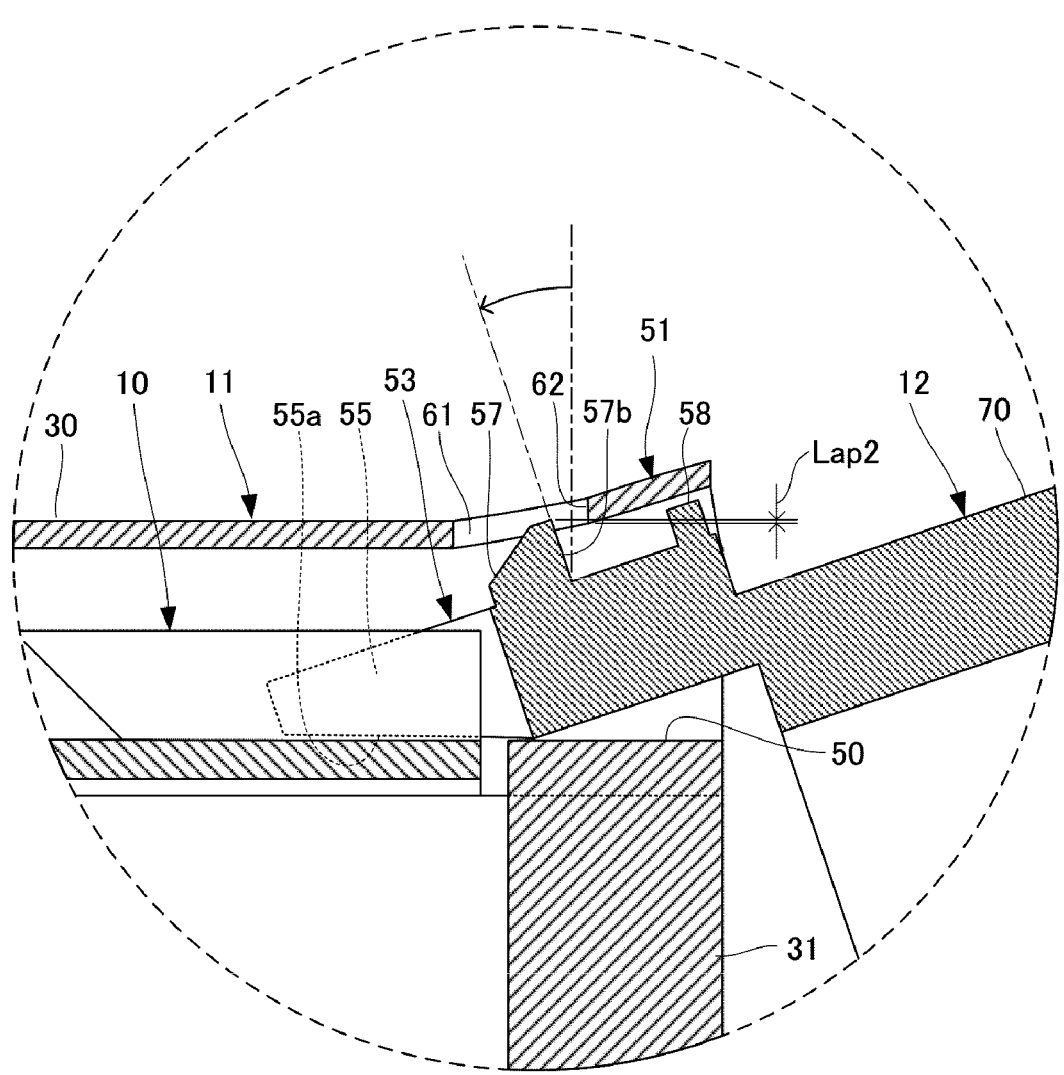
FIG. 11 is an enlarged view of a portion encircled by broken-line circle XI in FIG. 9B.

FIGS. 10 and 11 each show, in detail, the engagement relation between the catch projection 57 of the insertion portion 53 and the catch part 51 of the slider 11. FIG. 10 shows the engagement relation in the case where the second surface 53b of the insertion portion 53 is disposed in parallel to the front-rear direction of the plug 2, that is, the case where the insertion portion 53 is inserted into the slot 50 in parallel to the front-rear direction of the plug 2 (the fitting or removal direction). FIG. 11 shows the engagement relation in the case where the inclined surface 55a of the taper part 55 is disposed in parallel to the front-rear direction of the plug 2, that is, the case where the insertion portion 53 is inserted into the slot 50 as being inclined relative to the front-rear direction of the plug 2.

As shown in FIG. 10, in the case where the second surface 53b of the insertion portion 53 is disposed in parallel to the front-rear direction of the plug 2, the rear surface 57b of the catch projection 57 is substantially perpendicular to the second surface 53b. Accordingly, the rear surface 57b and the inner wall 62 of the catch part 51 face each other in the front-rear direction of the plug 2. In this case, when the tool 12 is pulled rearward from the plug 2, the catch projection 57 catches the catch part 51, and the slider 11 is pulled rearward integrally with the tool 12 (see FIGS. 7B to 7C).

On the other hand, as shown in FIG. 11, in the case where the inclined surface 55a of the taper part 55 is disposed in parallel to the front-rear direction of the plug 2, the rear surface 57b of the catch projection 57 falls on the side opposite to the inner wall 62 of the catch part 51. Accordingly, as compared to the case where the rear surface 57b and the inner wall 62 face each other in the front-rear direction of the plug 2, the engaging force between them is weak. In this case, when the tool 12 is pulled rearward from the plug 2, the catch part 51 easily passes over the catch projection 57, and the catch projection 57 cancels the catching of the catch part 51. Thus, the tool 12 is pulled out from the plug 2 (see FIGS. 9B to 9C).

The insertion portion 53 according to the present embodiment includes the pressing projection 58. In the state where the insertion portion 53 is inserted into the slot 50, the pressing projection 58 is in contact with the catch part 51 or disposed beneath the catch part 51 as being slightly spaced apart from the catch part 51. As shown in FIG. 11, when the inclined surface 55a of the taper part 55 is disposed in parallel to the front-rear direction of the plug 2, the catch part 51 is pushed upward by the pressing projection 58 while elastically bending. Thus, an engagement margin Lap2 between the rear surface 57b of the catch projection 57 and the inner wall 62 becomes smaller than an engagement margin Lap1 in the case where the second surface 53b of the insertion portion 53 is disposed in parallel to the front-rear direction of the plug 2. This further weakens the engagement force between the rear surface 57b and the inner wall 62, and the tool 12 is easily pulled out from the plug 2.

Second Embodiment

Figure 12A:
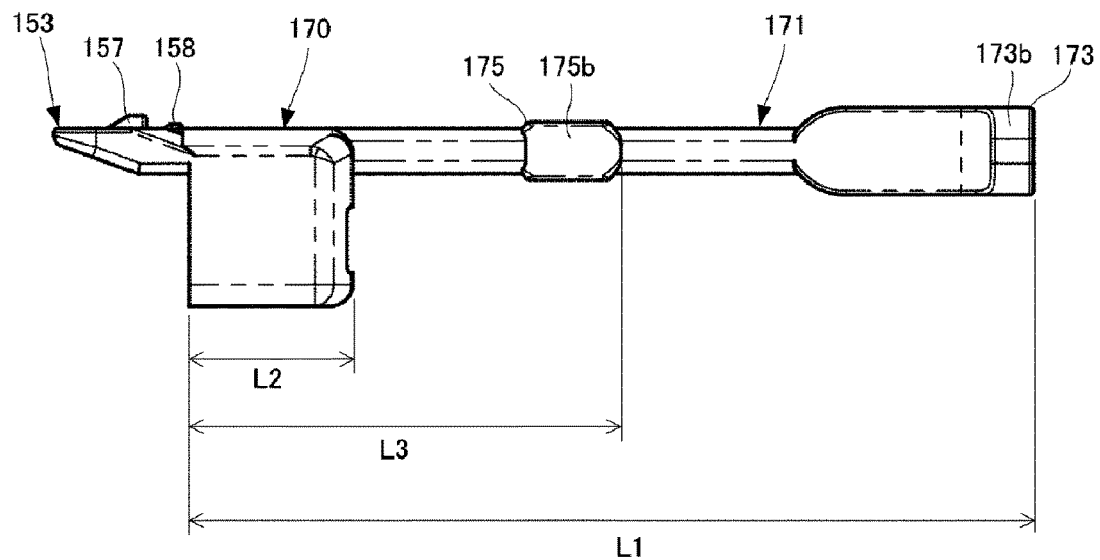
FIG. 12A is a side view of a tool for a plug according to a second embodiment.
Figure 12B:
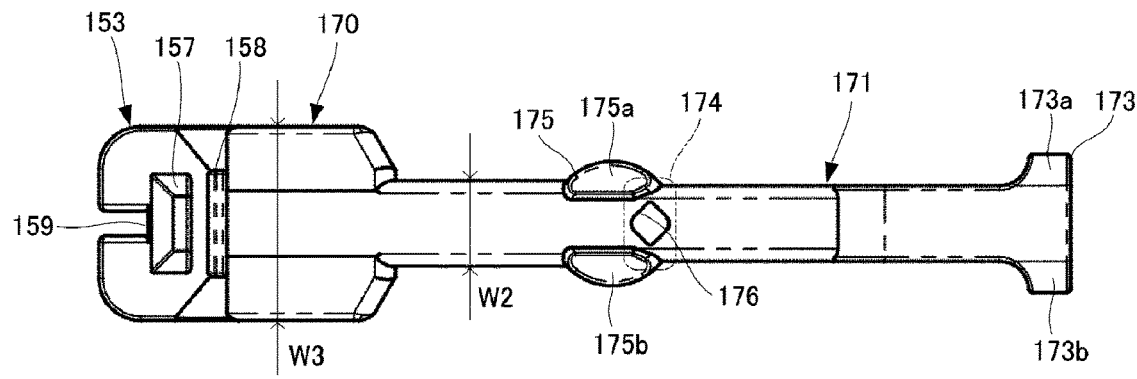
FIG. 12B is a plan view of the tool for a plug according to the second embodiment.
Figure 12C:
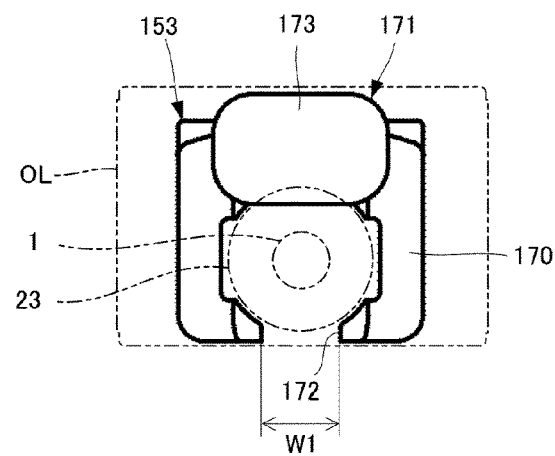
FIG. 12C is a rear view of the tool for a plug according to the second embodiment.

FIGS. 12A to 12C each show a tool for a plug according to a second embodiment which is applicable to the plug 2 described above.

The tool 112 includes an insertion portion 153, a boot surrounding part 170, and a handle 171. The insertion portion 153 is inserted into the slot 50 of the slider 11. The boot surrounding part 170 is adjacent to the insertion portion 153. The tool 112 is formed of a resin material. The insertion portion 153, the boot surrounding part 170, and the handle 171 are integrally formed. Note that, the insertion portion 153 is identical to the insertion portion 53 of the tool 12 according to the first embodiment. The description of the structure of the insertion portion 53 is incorporated herein by reference, to simplify or omit the description of the insertion portion 153.

The boot surrounding part 170 has a sleeve-like shape into which the optical fiber cable 1 and the boot 23 can be inserted. The boot surrounding part 170 includes a slit 172 which extends over the entire length in the axial direction. A width W1 of the slit 172 is greater than the diameter of the optical fiber cable 1, and smaller than the maximum diameter (the outer diameter of the basal end) of the boot 23. An arbitrary portion of the optical fiber cable 1 excluding the basal end covered with the boot 23 is capable of entering the boot surrounding part 170 through the slit 172, and capable of leaving the boot surrounding part 170 through the slit 172. On the other hand, the boot 23 cannot pass through the slit 172. Accordingly, the boot 23 and the boot surrounding part 170 accommodating the boot 23 restrain each other in the diameter direction of the boot 23.

The handle 171 has a rod-like shape. The handle 171 extends from the boot surrounding part 170 in the axial direction of the boot surrounding part 170 on the side opposite to the insertion portion 153. A width W2 of the handle 171 is smaller than a width W3 of the boot surrounding part 170. At the tip of the handle 171, a first grip part 173 is provided. The first grip part 173 includes a pair of convex parts 173a, 173b, which convex parts 173a, 173b project on the opposite sides in the width direction. Between the end of the boot surrounding part 170 on the handle side and the first grip part 173, a fragile part 174 is provided. Between the end of the boot surrounding part 170 on the handle side and the fragile part 174, a second grip part 175 is provided.

The fragile part 174 includes a through hole 176 which penetrates through the handle 171 in the thickness direction. Thus, the cross-sectional area of the parts of the handle 171 in the longitudinal direction is locally small at the fragile part 174. That is, the fragile part 174 is relatively fragile. Note that, the cross-sectional area of the fragile part 174 should just be locally small. The fragile part 174 may include a recessed part or a groove in place of the through hole 176.

Similarly to the first grip part 173, the second grip part 175 includes a pair of convex parts 175a, 175b, which convex parts 175a, 175b project on the opposite sides in the width direction. Preferably, the convex parts 175a, 175b project on the opposite sides in the thickness direction, having a portion of the fragile part 174 interposed between them. When the fragile part 174 is broken, the tip of the handle 171 is implemented by the second grip part 175. The edge resulting from the breakage of the fragile part 174 is housed in the pair of convex parts 175a, 175b. This avoids contact between the edge resulting from the breakage and the optical fiber cable 1, thereby minimizing the risk of breakage of the optical fiber cable 1 that may otherwise be done by such a contact with the edge.

As shown in FIG. 12C, when the tool 112 is seen from the removal direction, the boot surrounding part 170 of the tool 112 is positioned inner than the outermost shape line OL of the plug 2. As used herein, the outermost shape line OL of the plug 2 is, when the plug 2 without the tool 112 is parallel-projected so that the projection line is perpendicular to the projection plane, the contour line of the projection of the plug 2 on the projection plane.

The tool 112 is attached to the plug 2 as follows. Firstly, a portion of the optical fiber cable 1 excluding the basal end covered with the boot 23 is accommodated in the boot surrounding part 170 through the slit 172. Then, the tool 112 accommodating the optical fiber cable 1 in the boot surrounding part 170 is shifted toward the basal end side of the optical fiber cable 1 along the optical fiber cable 1 so that the boot surrounding part 170 accommodates the boot 23. The insertion portion 153 is inserted into the slot 50 of the slider 11, so that the catch projection 157 catches the catch part 51 of the slider 11.

In fitting the adapter 5 and the plug 2 to each other using the tool 112, the insertion portion 153 of the tool 112 is inserted into the slot 50 of the slider 11. In the state where the pressing part 159 of the insertion portion 153 abuts on the pressed part 52 of the plug body 10, the handle 171 of the tool 112 is pressed in the fitting direction. The plug frame 21 of the plug body 10 and the front end 27 of each latch 25 are inserted into the adapter 5, and the plug body 10 shifts in the fitting direction until the adapter 5 and the plug frame 21 fit to each other. Then, the catch part 6 of the adapter 5 passes over the catch projection 28 of the latch 25, and the catch projection 28 is caught by the catch part 6 (see FIGS. 6A to 6C).

In removing the plug 2 from the adapter 5 using the tool 112, the insertion portion 153 of the tool 112 is inserted into the slot 50 of the slider 11. In the state where the second surface 153b of the insertion portion 153 is disposed in parallel to the removal direction of the plug body 10, the handle 171 of the tool 112 is pulled in the removal direction of the plug body 10. The catch projection 57 of the insertion portion 53 catches the catch part 51 of the slider 11, and the slider 11 also is pulled in the removal direction. The slider 11 pulled in the removal direction shifts in the removal direction relative to the plug body 10 fixed to the adapter 5, and each push-down part 33 of the slider 11 pushes down corresponding latch 25. The pushed down front end 27 of the latch 25 is displaced toward the outer surface 21a of the plug frame 21. In accordance with the displacement of the front end 27, the engagement between the catch part 6 of the adapter 5 and the catch projection 28 provided at the front end 27 is canceled, allowing the fitting between the adapter 5 and the plug frame 21 to be canceled. As the tool 112 is continuously pulled in the removal direction, the slider 11 reaches one end in the removal direction in the movable range. Subsequently, integrally with the slider 11, the plug body 10 also is pulled in the removal direction. Thus, the fitting between the adapter 5 and the plug frame 21 is canceled, and the plug frame 21 is pulled out from the adapter 5.

Figure 13:
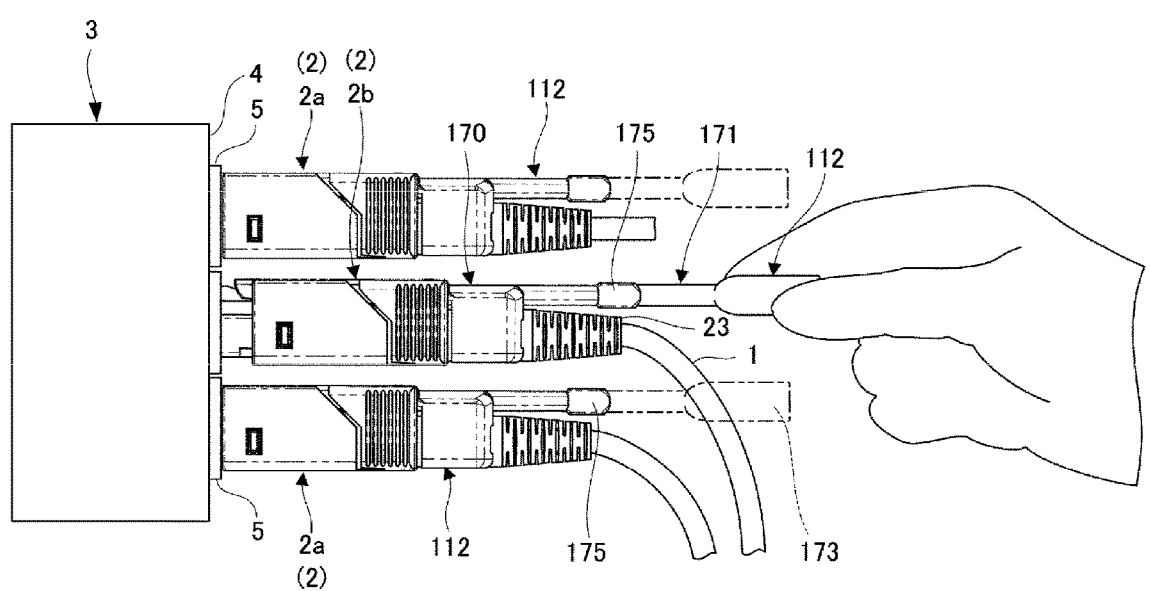
FIG. 13 is a schematic illustration for describing the operation of the tool for a plug shown in FIGS. 12A to 12C.

FIG. 13 schematically shows the operation of the tool 112.

In the example shown in FIG. 13, to a part of a plurality of adapters 5 provided at the panel 4 of the device 3, the plugs 2 are already fitted. The adapters 5 are densely disposed, and there exists just a slight clearance between adjacent two pieces of plugs 2 fitted to the adapters 5. In this state, a plug 2 is fitted to a free adapter 5. Hereinafter, the plugs 2 already fitted to the adapters 5 are referred to as the plugs 2a, and the plug 2 to be fitted to the free adapter 5 is referred as the plug 2b, to be distinguished from each other.

To the plug 2b, the tool 112 is attached. The boot surrounding part 170 of the tool 112 accommodates the boot 23, and restrains the boot 23 in the diameter direction. The insertion portion 153 of the tool 112 is inserted into the slot 50 of the slider 11, to catch the slider 11. Thus, the plug 2b is retained on the tool 112 without coming off frontward. This improves workability in fitting the plug 2b to the adapter 5.

As shown in FIG. 12C, the boot surrounding part 170 of the tool 112 is positioned inner than the outermost shape line OL of the plug 2. Accordingly, the clearance between the tool 112 attached to the plug 2b and the tools 112 attached to the plugs 2a around the plug 2b is wider than the clearance between the plug 2b and the surrounding plugs 2a. In particular, the width W2 of the handle 171 is smaller than the width W3 of the boot surrounding part 170, and the clearance around the handle 171 is wider than the clearance around the boot surrounding part 170. This allows the user to surely grip the handle 171 of the tool 112 attached to the plug 2b and facilitates the user's manipulating the tool 112.

The boot 23 and the boot surrounding part 170 accommodating the boot 23 restrain each other in the diameter direction of the boot 23. This minimizes any tilting of the tool 112 relative to the plug 2b. Thus, the force applied to the tool 112 is fully used in fitting the plug 2b and the adapter 5 to each other. This also minimizes the risk of breakage of the insertion portion 53 and the slot 50 that may otherwise be done by excessively tilted tool 112.

While the foregoing is the operation of the tool 112 is the operation in fitting the plug 2b and the adapter 5 to each other, this similarly applies to the operation in removing the plug 2b from the adapter 5. That is, the user is allowed to surely grip the handle 171 of the tool 112 attached to the plug 2b, to manipulate the tool 112 and easily pull out the plug 2b from the adapter 5. The force applied to the tool 112 is fully used in pulling out the plug 2b. This also minimizes the risk of breakage of the insertion portion 53 and the slot 50 that may otherwise be done by excessively tilted tool 112.

By the fragile part 174 of the handle 171 broken in the state where the plug 2b is fitted to the adapter 5, the length of the handle 171 extending in the removal direction from the plug 2b is reduced. This facilitates routing the optical fiber cables 1 extending in the removal direction from the plug 2b and the surrounding plugs 2a. After the fragile part 174 is broken, the second grip part 175 remains on the handle 171. Accordingly, in removing the plug 2b from the adapter 5, the user is allowed to grip the second grip part 175 to easily pull out the plug 2b from the adapter 5.

In view of workability in fitting the plug 2 to the adapter 5 and removing from the adapter 5, a length L1 from the end of the boot surrounding part 170 on the insertion portion side to the tip of the handle 171 is preferably longer than the boot 23. In view of routing the optical fiber cable 1 in the state where the plug 2 is fitted to the adapter 5, a length L2 of the boot surrounding part 170 is preferably shorter than the boot 23. A length L3 from the end of the boot surrounding part 170 on the insertion portion side to the tip of the second grip part 175 can be set as appropriate taking into consideration of workability and routing of the optical fiber cable 1. The length L3 longer than the boot 23 improves workability; the length L3 shorter than the boot 23 facilitates routing of the optical fiber cable 1.

The boot surrounding part 170 of the tool 112 according to the present embodiment can be dispensed with. In this case, the handle 171 extends directly from the insertion portion 153 in the axial direction.

In the present embodiment, the slider 11 and the tool 112 have been described as separate members. Here, the slider 11 and the tool 112 may be integrated with each other as a single member. In this case, the handle 171 extends directly from the slider 11 in the axial direction. That is, the handle 171 extends oppositely to the plug body 10 and integrally with the slider 11.

In the foregoing, the description has been given of the embodiments of the optical fiber cable 1 and the plug 2 attached to the terminal part. It goes without saying that the embodiments are merely examples, and any change may be made within the scope not deviating from the gist of the present disclosure. For example, the cable may be an electric cable (for example, a LAN (Local Area Network) cable). The cable may be a branch cable including a main line and a plurality of branch lines. When the cable is a branch cable, the terminal part of the cable to which the plug is attached includes the terminal part of the main line and/or the terminal part of each branch line.

REFERENCE SIGNS LIST 1 optical fiber cable
2 plug
5 adapter
10 plug body
11 slider
12 tool
50 slot
53 insertion portion
59 pressing part
70 boot surrounding part
71 handle
72 slit
112 tool
153 insertion portion
159 pressing part
170 boot surrounding part
171 handle
172 slit
173 first grip part
174 fragile part
175 second grip part
OL outermost shape line of plug 2

What is claimed is:

1. A tool for a plug to which a cable having a basal end covered with a boot is attached, the plug including a plug body configured to be fitted to an adapter and a slider supported on the plug body, the tool comprising:
an insertion portion configured to catch the slider; and
a boot surrounding part having a sleeve-like shape and configured to accept insertion of the cable and the boot, to accommodate the boot in a state where the insertion portion is catching the slider, wherein
the boot surrounding part includes a slit extending along an entire length in an axial direction and having a width greater than a diameter of the cable and smaller than a maximum diameter of the boot,
in the state where the insertion portion is catching the slider, the boot surrounding part is positioned inner than an outermost shape line of the plug as seen in the axial direction, and
the insertion portion includes a pressing part configured to press the plug body or the slider in the axial direction.

2. The tool for a plug according to claim 1, wherein the insertion portion catches the slider when positioned in parallel to the axial direction, and cancels the catching the slider when inclined relative to the axial direction.

3. The tool for a plug according to claim 2, wherein the insertion portion includes:
a taper part having a thickness reduced toward a tip thereof; and
a basal part positioned on the boot surrounding part side than the taper part is and having a constant thickness.

4. The tool for a plug according to claim 2, further comprising a handle extending in the axial direction further than the boot from the boot surrounding part, in the state where the insertion portion is catching the slider.

5. The tool for a plug according to claim 1, wherein the insertion portion includes:
a taper part having a thickness reduced toward a tip thereof; and
a basal part positioned on the boot surrounding part side than the taper part is and having a constant thickness.

6. The tool for a plug according to claim 5, further comprising a handle extending in the axial direction further than the boot from the boot surrounding part, in the state where the insertion portion is catching the slider.

7. The tool for a plug according to claim 1, further comprising a handle extending in the axial direction further than the boot from the boot surrounding part, in the state where the insertion portion is catching the slider.

8. The tool for a plug according to claim 7, wherein the handle includes:
a first grip part; and
a fragile part positioned between a rear edge of the boot surrounding part and the
first grip part, a cross-sectional area of the fragile part perpendicular to the axial direction being locally small.

9. The tool for a plug according to claim 8, wherein the handle includes a second grip part provided between the rear edge of the boot surrounding part and the fragile part.

10. The tool for a plug according to claim 8, wherein the fragile part includes a through hole, a recessed part, or a groove.

11. The tool for a plug according to claim 1, wherein the boot surrounding part includes a recessed side surface.

12. A plug comprising:
the tool for a plug according to claim 1; and
the slider including a slot configured to accept insertion of the insertion portion.

13. A cable with a plug, comprising:
the cable; and
the plug according to claim 12 attached to a terminal part of the cable.

* * * * *